United States Patent
Sharpe

[11] 3,835,267
[45] Sept. 10, 1974

[54] REEL FOR ELECTRIC EXTENSION CORDS
[76] Inventor: Floyd L. Sharpe, 10416 McPherson, Indianapolis, Ind. 46280
[22] Filed: Dec. 4, 1973
[21] Appl. No.: 421,656

[52] U.S. Cl. .......................... 191/12.4, 191/12.2 R
[51] Int. Cl. ........................................... H02g 11/00
[58] Field of Search........ 191/12.2 R, 12.4; 343/877

[56] References Cited
UNITED STATES PATENTS
2,274,330  2/1942  Hammond...................... 191/12.2 R
3,369,084  2/1968  Cook ................................. 191/12.4

*Primary Examiner*—M. Henson Wood, Jr.
*Assistant Examiner*—D. W. Keen

[57] ABSTRACT
A reel for electric extension cords for storing a length of electric cord thereabout with any desired length of cord being unrolled therefrom with the remaining length of the cord retained rolled about the reel, the reel including a base having a shaft projecting upwardly therefrom and supporting for rotation at the top end of the shaft a spool mounted for rotation about the axis of the hub of the spool and having a top disc and bottom disc defining opposite ends of the spool, an electric receptacle mounted in the outer disc and having one end of an electrical cord attached thereto with the length of the cord being wound about the hub of the spool and terminating in an opposite end adapted to be plugged into a suitable power source, and a handle rotatably mounted to the top disc member adjacent an edge thereof and adapted for use in rotating the spool about its axis to unwind the electric cord from the hub of the spool and also to rewind the electric cord onto the spool hub.

2 Claims, 5 Drawing Figures

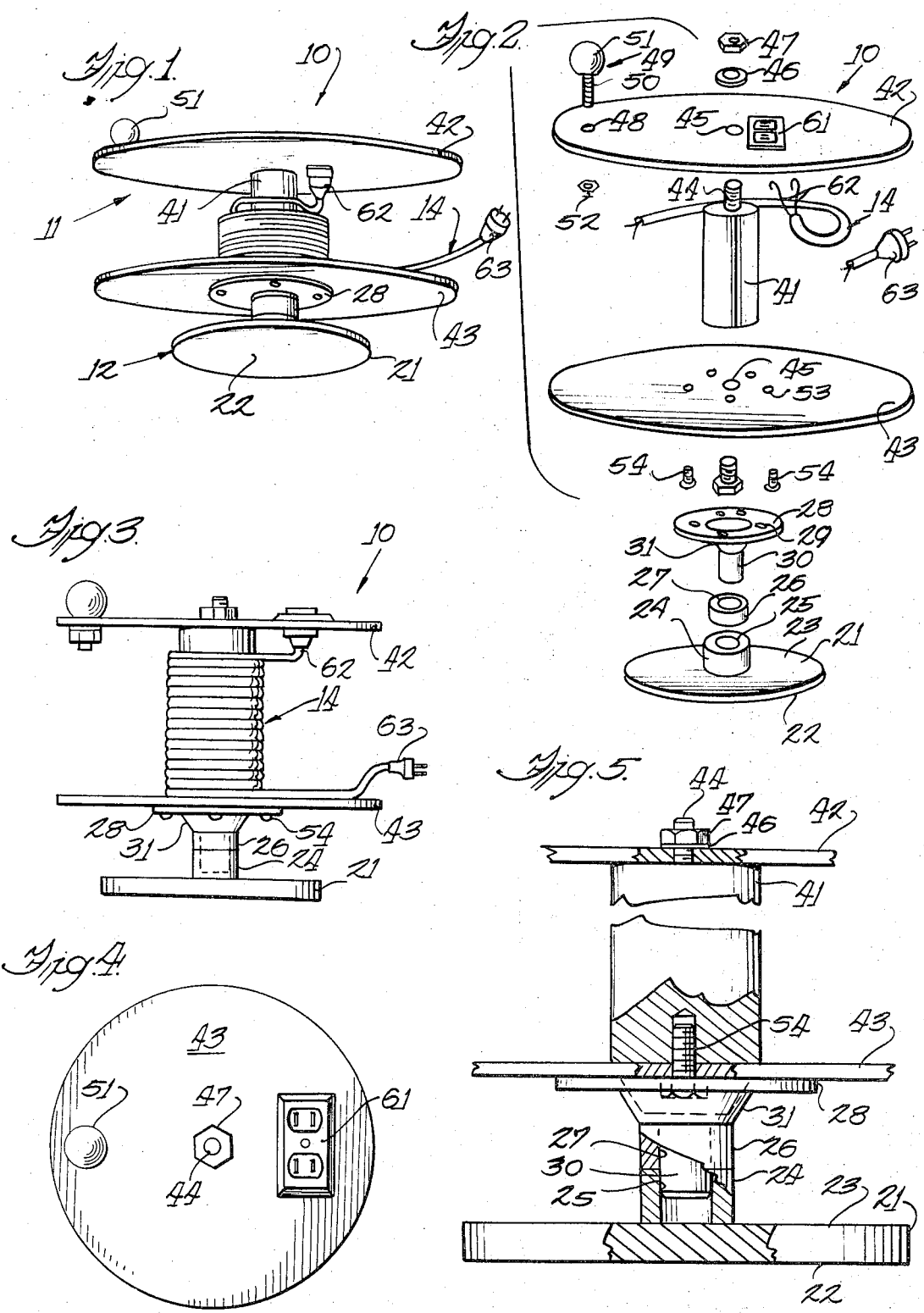

REEL FOR ELECTRIC EXTENSION CORDS

BACKGROUND OF THE INVENTION

1. Field of the Invention

This invention relates generally to electrical cords and winding devices and more particularly to a novel reel intended for use with electric extension cords for the storage of excess length of such cords thereabout.

2. Description of the Prior Art

When working about the shop, or on a construction site, or the like it is normally required that the workmen be provided with a source of electrical energy into which they may plug their associated tools, such as electric drills, saws and the like, with it being required that such cords not provide a hazard when extending from the source of electrical energy to the place of working with the tool, it thus being normally required that the excess length of any extension cords be neatly coiled on the floor or the like, this being a time consuming process which often is not performed due to the time required for the same, and accordingly the excess length of electrical cord lies randomly about the floor and forms a hazard to other workmen and other persons at the work site as to the danger of tripping thereover, inadvertently cutting the electrical cord and receiving an electrical shock therefrom, and the like.

While prior art devices are known for retaining excess lengths of extension cords, such devices are not satisfactory for one or another reasons and as such have not been accepted by the public or by the construction industry, such reasons being due to excess cost, lack of flexibility, lack of strength and durability, and the like.

SUMMARY OF THE INVENTION

The present invention recognizes the problem of handling extension cords for purposes of storage while permitting ease of accessibility for use of a selected length of the extension cord, and provides a novel reel device intended for use with electric extension cords wherein the end of the extension cord may be conveniently plugged into any available power source, such as a conventional wall outlet receptacle, with the extension cord then being readily unwound from the reel as it is required with the tool or other electrical item to be run being readily plugged into an electrical outlet mounted on the reel, with the cord being readily rewound onto the reel at the conclusion of the job in a rapid and expedient manner and without any tangling or kinking of the cord.

It is a feature of the present invention to provide a reel for electric extension cords and which is adapted for winding and unwinding the electric cord therefrom in a manner preventing any tangles, kinks, or the like in the extension cord.

A further feature of the present invention provides a reel for electric extension cords intended for the winding and unwinding of the electric extension cord therefrom and providing for the easy unwinding of any required length of extension cord from the reel with the remaining length of extension cord not required being conveniently and compactly retained on the reel in an out of the way manner and yet readily available should the same be later required.

The provision of a reel for an electric extension cord which is relatively simple in its construction and which therefore may be readily manufactured at a relatively low cost and by simple manufacturing methods; one which is is possessed of few parts and which therefore is unlikely to get out of order; one which is rugged and durable and which therefore may be guaranteed by the manufacturer to withstand many years of intended usage; one which is easy to use and reliable and efficient in operation; and one which, otherwise, is well adapted to perform the services required of it, are among the further desirable features and advantages which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a reel constructed in accordance with the present invention and viewed from the bottom portion thereof;

FIG. 2 is an exploded perspective view of the reel of the invention;

FIG. 3 is a front elevational view of the reel;

FIG. 4 is a top plan view of the reel; and

FIG. 5 is a fragmentary enlarged front elevational view of the reel partially broken away to illustrate the various components thereof in their respective assembled positions.

DESCRIPTION OF THE PREFERRED EMBODIMENT

Referring now to the drawings in detail there is illustrated a preferred form of a reel for use with an electric extension cord and which is designated generally in its entirety by the reference numeral 10 and which is comprised of a spool 11, a base assembly 12, and an electric cord 14.

The base assembly 12 is formed of a disc shaped base member 21 having a bottom surface 22 and a top surface 23 with a socket 24 disposed concentrically with the base member and having a cylindrical recess 25 centrally thereof and extending axially therethrough. A cylindrical ring shaped bushing 26 having an opening 27 extending axially therethrough of the same diameter as opening 25 is provided and is adapted to fit on the top edge of the socket 24. A circular spool rotating flange 28 is supplied with openings 29 disposed about the circumference thereof and extending therethrough, and having an axially outwardly projecting shaft 30 with a truncated inverted conical top portion 31 interconnecting the top end of the shaft to the bottom surface of the flange, the shaft 30 adapted to be inserted through axially aligned openings 27 and 25 with the exterior surface of conical member 31 resting on the top edge of bushing 26 and rotatable relative to base member 21. The base member 21 is preferably manufactured of a heavy material, such as cast iron for purposes of stability and to assist in retaining the reel 10 in the selected position on the ground, floor or the like on which the bottom surface 22 of the base is in resting engagement.

The spool 11 comprises a cylindrical hub 41 which is disposed between a pair of circular end plates 42 and 43 which are of a substantially greater diameter than the diameter of the hub, the opposite ends of the hub each provided with an axially extending threaded member 44 adapted to be inserted through an associated opening 45 in the axial center of each of end plates 42 and 43 and secured thereto by use of a washer 46 and a nut 47. The end plate 42 defines the top of the spool and is provided with an opening 48 adjacent the edge thereof and through which is adapted to be inserted a rotating handle member 49 having a threaded shaft 50 with an enlarged hand gripping portion 51 at one end thereof, the opposite end of shaft 50 adapted to be axially inserted through opening 48 with a nut 52 threadedly secured on shaft 50 to retain the handle 49 secured to the top end plate 42. It is to be understood that the handle 49 may be rotatable about its axis relative to the top end plate 42, or may be non-rotatably affixed thereto, and that in either alternative the handle provides a means to effect the rotation of the spool 11 as will be later described.

The bottom end plate 43 is provided with a plurality of angularly spaced apart openings 53 which correspond in spacing to openings 29 in spool rotating flange 28, the openings 53 adapted to be axially aligned with associated openings 29 with the spool 11 then secured to the base assembly 12 by the use of bolts 54 or the like which pass through associated aligned openings 53 and 29 and are secured in place by nuts and the like, thus affixing bottom end plate 43 to spool rotating flange 28.

The top end plate 42 is provided with an electrical receptacle 61 extending therethrough, the terminals of the electrical receptacle being connected to one end 62 of the electrical cord 14 with the balance of the cord being wound around the hub 41, and the outer end of the cord is provided with an electric plug 63 which may be plugged into a wall socket or the like to provide a source of electrical energy to the receptacle 61.

In using the reel 10 of the present invention, an individual inserts the plug 63 into an electrical outlet or the like which may be inside or outside of a house, work site, office or the like, then unwinds the desired length of cord 14 from the spool 11 and then merely plugs the plug of an electrically operated device (not shown) such as an electric saw, electric drill and the like into the receptacle 61 in the end plate 42. Only the length of electrical cord 14 desired need be unwound from the spool 11 with the balance of the cord being conveniently retained on the hub 41 of the spool. Thus, by utilizing the reel 10 of the present invention an electrical appliance, such as a drill, saw and the like, having a fixed length of cord associated therewith may be used a considerable distance from a source of electrical energy by merely plugging such appliance into the reel receptacle 61 with the cord 14 traveling the required distance to the source of electrical energy.

It is to be noted that the spool 11 is conveniently rotatably mounted about the axis of the hub on the base assembly 12 such that ready rewinding of the cord is conveniently available by use of the handle 49 which is gripped in a hand of an individual and used to effect the rotation of the spool about its axis in a manner to wind electric cord 14 about the hub 41.

There is thus provided a convenient and easily used reel for an electric extension cord from which the cord may be easily and efficiently unrolled to any required length to bridge the distance between a source of electrical energy and the position at which the reel is placed and at such position where electrical energy is required, with the electric cord being readily rewound onto the reel by simply manually turning the spool when the electrical energy is no longer required, this effecting the rewinding of the cord in a non-tangling manner keeping the electric cord free of kinks, tangles and the like thus lengthening the life of the cord while simultaneously protecting the cord during the storage thereof in between uses of the same.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A reel intended for use with electric extension cords comprising: a base member, a spool rotating flange connected to said base member and projecting upwardly therefrom and rotatable about its axis relative thereto; a first circular substantially flat end plate adapted to be axially disposed relative to said spool rotating flange; means securing said first end plate to said rotating flange; a cylindrical hub having one end mounted concentrically to said first end member with said hub projecting axially upwardly therefrom; a second substantially flat circular end plate disposed concentrically with the opposite end of said hub and connected axially thereto for simultaneous rotation therewith; an opening disposed adjacent an edge of said second end plate; a handle member adapted to be connected to said opening, said handle member having an enlarged head portion adapted to be gripped in an individual's hand in a manner to effect the rotation of said interconnected second and first end plates and hub member in selected opposite directions about the axis of said hub; an electrical receptacle mounted in said second end plate and facing outwardly therefrom to receive the plug of an electrical appliance cord therein; an electrical extension cord removably wound about said hub between said end plates and having an inner end electrically connected to said outlet and having the opposite outer end provided with an electrical plug adapted for insertion into a wall socket to provide electrical energy through said cord and into said electrical receptacle, whereby said electrical cord is readily wound onto and unwound from the hub by rotation of the hub and associated end plates by use of said handle member.

2. The reel as set forth in claim 1 wherein said base member includes a bottom surface and a top surface; an open ended hollow cylindrically shaped socket member having one end affixed concentrically to said base member top surface and projecting outwardly therefrom, an opening extending axially completely through said socket member; a ring shaped cylindrical bushing member of a diameter substantially equal to the diameter of said socket member, an opening extending axially through said bushing member of a diameter substantially equal to the diameter of said opening in said socket member; said spool rotating flange including a top substantially flat disc shaped member having a top surface and a bottom surface, said top surface adapted to be placed in juxtaposition with a face surface of said bottom end plate, a truncated inverted conical member having the base portion thereof affixed concentrically to said bottom surface of said disc member with the truncated apex portion thereof having a diameter substantially equal to the diameter of said bushing member, an elongated cylindrical shaft disposed concentric with said apex surface and projecting axially outwardly therefrom, the diameter of said shaft being less than the diameter of said openings in said bushing and said socket; whereby said bushing is axially aligned with said socket and said shaft is axially inserted through said aligned bushing and socket openings with said apex surface in rotating resting engagement with the top edge surface of said bushing to provide for rotation of said disc member about its axis relative to said base member.

* * * * *